ENDLESS TRACK DRIVE FOR SNOW VEHICLES

Filed April 3, 1964

INVENTOR
Louis H Olson
BY [signature]
HIS ATTYS

United States Patent Office 3,250,577
Patented May 10, 1966

3,250,577
ENDLESS TRACK DRIVE FOR SNOW VEHICLES
Louis H. Olson, St. James, Manitoba, Canada, assignor of fifty-one percent to H. C. Paul Limited, Winnipeg, Manitoba, Canada
Filed Apr. 3, 1964, Ser. No. 357,077
1 Claim. (Cl. 305—13)

My invention relates to new and useful improvements in endless track drive for snow vehicles.

Conventional snow vehicles normally include chains engageable around sprockets with endless flexible tracks spanning the chains and extending therearound.

However, these are unsatisfactory particularly when being used in snow as the snow tends to pack and form ice thus making the drive inefficient and impractical under certain conditions.

I have overcome these disadvantages by providing an endless track drive formed of rubberized canvas or the like and having cross bars formed on the outer surface thereof. Upon the inner surface I provide a plurality of resilient projections which are engageable within apertures formed clear through the rims of the drive sprockets.

The principal object and essence of my invention is therefore to provide a device of the character herewithin described in which snow packing is eliminated.

Another object of my invention is to provide a device of the character herewithin described in which the engaging apertures within the drive sprockets are self clearing due to the fact that they are formed clear through the rim of the drive sprocket.

A further object of my invention is to provide a device of the character herewithin described which is considerably quieter and has less vibration than conventional forms of endless track drives.

A yet further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
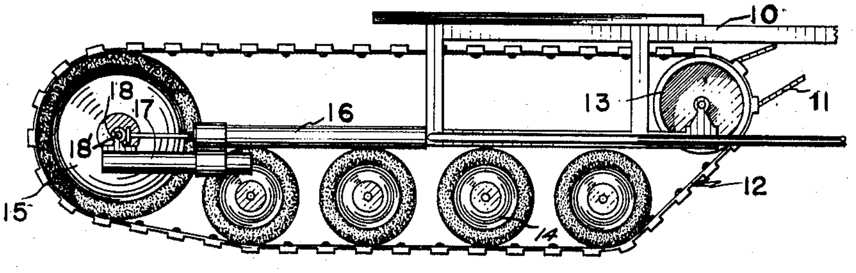
FIGURE 1 is a side elevation of the portion of a snow vehicle showing my drive in situ.

Proceeding therefore to describe my invention in detail, reference character 10 shows part of the framework of a conventional snow vehicle having chain 11 engageable around a sprocket (not illustrated) and being connected to the source of power (not illustrated).

An endless track collectively designated 12 extends around a pair of spaced and parallel drive sprockets or pulleys 13 driven by chain 11, around rubber tired idler wheels 14 and around the rear rubber tired wheel 15 of the vehicle. The rear wheel 15 is mounted upon frame extensions 16 and conventional endless track adjustment means 17 reacts between the frame members and the wheel mounting 18 for tension adjustment of the endless track.

The drive sprockets or pulleys 13 are each in the form of a hub 19 secured to shaft 20 and having a rim 21 formed around the hub. This rim is provided with concavedly conical or frusto-conical apertures 22 clear through and in spaced relationship around the perimeter of the rim.

The endless track collectively designated 12 comprises a spring steel reinforcement strip 23 around which is moulded rubber or the equivalent 24 in order to form the flat belt.

Figure 3:
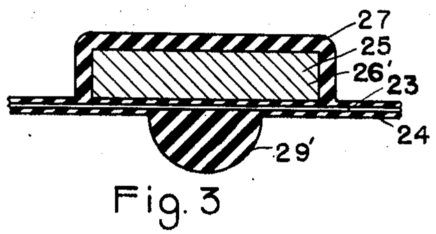
FIGURE 3 is a cross sectional enlarged elevation of one embodiment of the track.
Figure 4:
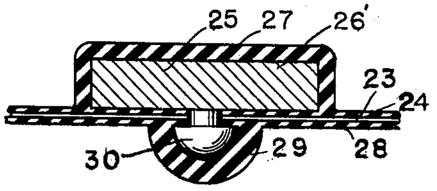
FIGURE 4 is a cross sectional enlarged view of another embodiment of the track.

Transverse ribs 25 are formed in spaced and parallel relationship upon the outer surface 26 of the belt, said ribs including a spring steel strip 26' covered by moulded rubber or the like 27 as clearly shown in FIGURES 3 and 4.

Formed upon the inner surface 28 of the belt is a plurality of drive sprocket engaging elements 29 and the pitch of these elements is the same as the pitch of apertures 22 so that these elements engage within the apertures and transmit drive from the sprockets to the belt.

FIGURE 3 shows a solid rubber or similar material hemispherical drive element or stud 29' formed integrally with the belt and FIGURE 4 shows a similar construction with a reinforcing rivet 30 formed therein and engaged within the spring steel reinforcing 23 of the belt.

Figures 2, 5, 6, 7:
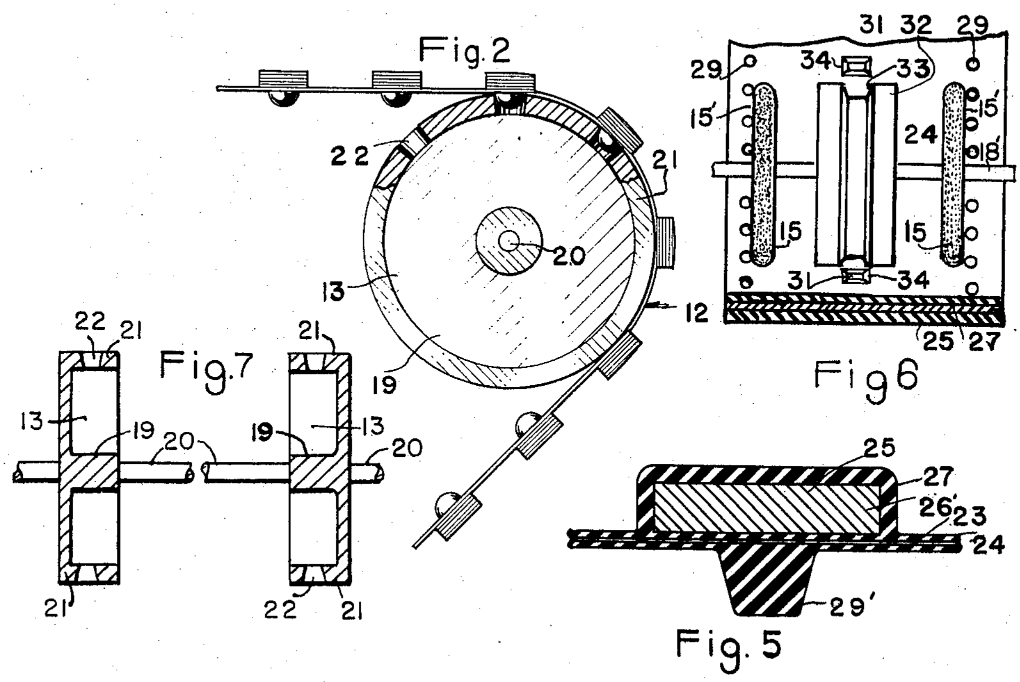
FIGURE 2 is an enlarged fragmentary side elevation of the drive sprocket engageable by one embodiment of the track.
FIGURE 5 is a cross sectional enlarged view of a still further embodiment of the device.
FIGURE 6 is a partially sectioned inside view of the belt and idler pulleys and idler wheels shown in reduced scale to the remainder of the drawings.
FIGURE 7 is a vertical sectional view showing the pair of belt driving pulleys on their shaft.

FIGURE 5 shows a further embodiment in which the drive element 29' is in the form of a truncated cone and it will be appreciated that all of the embodiments shown in FIGURES 3, 4 and 5 are of a similar pitch to the apertures 22 in the drive sprockets and are engageable therewith.

Due to the rounded surface configuration of the drive elements 29', snow does not pack thereagainst and furthermore due to the fact that they are relatively resilient, any icing which might occur does not adhere readily to the outer surfaces.

As the drive elements 29' are engaged by the apertures 22 of the drive sprockets, any snow packing which may have occurred within the apertures is forced clear through the rim so that it becomes disengaged therefore assuring that the apertures 22 do not become plugged.

The hemispherical or truncatedly conical configuration of the drive elements 29 facilitates the engagement and disengagement thereof within the apertures 22 and, of course, due to the fact that the drive elements are of rubber or similar material, the drive is relatively quiet and free of vibration.

Reference should next be made to FIGURE 6 in which the inner surface of the belt 24 is shown in relation to the rear idler wheels 15 which are journalled upon a shaft 18' carried in the aforementioned bearings 18.

The resilient drive elements 29 are positioned so that they pass by the outer sides 15' of the idler wheels 15.

When a relatively wide belt is used, there is a tendency for the center area of the belt to cavitate due to the pull thereon. Furthermore, there is a tendency for a relatively long endless belt to wander from side to side thus causing wear to occur between the idler wheel sides 15' and the drive elements 29.

I have overcome both of these tendencies by providing a plurality of resilient projections 31 on the inner surface of the belt 24 and positioned between the two rows of drive elements 29.

The cross sectional configuration of these elements 31 can be conical or, preferably, truncatedly pyramidal.

A grooved wheel 32 is journalled upon shaft 18', the sides 33 of the groove sloping to complement the sloping sides 34 of the elements 31 which engage within this groove as the belt passes around the wheel 32.

This not only prevents cavitation from occurring, but also prevents sideways movement of the belt with relation to the idler wheels and eliminates undue wear occurring to the drive elements 29.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In an endless track for snowmobiles, the combination of a drive shaft having a pair of spaced drive pulleys each including an annular rim having inner and outer peripheral surfaces, said rims being provided at circumferentially spaced points with inwardly tapering frustoconical apertures open at both the inner and outer surfaces of the rims whereby to prevent lodgement of snow in said apertures and render the same self-cleaning, an endless track belt of resiliently flexible rubber-like material extending transversely across said pulley rims, said belt having an inner surface engaged by said outer peripheral surfaces of said pulley rims and also having an outer surface, a spring metallic reinforcing band extending substantially across the width of and embedded in said belt, a row of inwardly projecting hemispherical drive studs provided at longitudinally spaced points on the inner surface of said belt at each of the laterally opposite sides thereof and integrally therewith, a reinforcing rivet completely enclosed in each of said studs and engaged by said band, said studs being complementally received in said apertures of said wheel rims to positively transmit drive from the pulleys to the belt, a plurality of transversely extending cross bars provided integrally on the outer surface of said belt to afford positive traction in snow, and bar-like metallic reinforcements located opposite said drive studs embedded in said cross bars and extending substantially across the width of said belt.

References Cited by the Examiner

UNITED STATES PATENTS

| | | | |
|---|---|---|---|
| 1,107,492 | 8/1914 | Carr | 305—35 X |
| 1,786,539 | 12/1930 | Kegresse | 305—35 X |
| 1,814,046 | 7/1931 | Kegresse | 305—35 |
| 2,037,983 | 4/1936 | Johnston | 305—38 |
| 2,724,974 | 11/1955 | Ayres. | |

FOREIGN PATENTS

| | | | |
|---|---|---|---|
| 678,766 | 1/1964 | Canada. | |

BENJAMIN HERSH, *Primary Examiner.*

ARTHUR L. LA POINT, *Examiner.*

R. J. JOHNSON, *Assistant Examiner.*